United States Patent [19]

Lienenkamp

[11] Patent Number: 5,573,296
[45] Date of Patent: Nov. 12, 1996

[54] CONVERTIBLE TOP COVER

[76] Inventor: Joerg Lienenkamp, Fleyer Strasse 86, D-58097 Hagen, Germany

[21] Appl. No.: 406,093

[22] Filed: Mar. 16, 1995

Related U.S. Application Data

[63] Continuation of Ser. No. 119,183, filed as PCT/DE92/01057, Dec. 17, 1992, abandoned.

[30] Foreign Application Priority Data

Jan. 24, 1992 [DE] Germany .......................... 42 01 874.9

[51] Int. Cl.$^6$ ........................................................ B60J 7/20
[52] U.S. Cl. ......................................... 296/136; 296/37.16
[58] Field of Search .................................. 296/136, 37.16

[56] References Cited

U.S. PATENT DOCUMENTS

| | | | |
|---|---|---|---|
| 2,599,277 | 6/1952 | Orr ........................................ | 296/37.16 |
| 2,747,928 | 5/1956 | Olivier et al. ....................... | 296/136 X |
| 2,992,042 | 7/1961 | Gilson et al. ......................... | 296/136 |
| 3,053,567 | 9/1962 | Geiger ................................... | 296/136 X |
| 3,170,726 | 2/1965 | Lystad .................................... | 296/136 |
| 4,600,233 | 7/1986 | Boydston ............................. | 296/136 X |
| 4,799,729 | 1/1989 | Muscat .................................. | 296/136 |

FOREIGN PATENT DOCUMENTS

| | | | |
|---|---|---|---|
| 0302963A1 | 2/1989 | European Pat. Off. . | |
| 1083139 | 6/1960 | Germany .............................. | 296/136 |
| 3801148C1 | 4/1989 | Germany .............................. | 296/136 |
| 3925867C1 | 6/1990 | Germany . | |
| 3939145A1 | 5/1991 | Germany .............................. | 296/136 |
| 90817 | 4/1989 | Japan .................................... | 296/136 |

*Primary Examiner*—Dennis H. Pedder
*Attorney, Agent, or Firm*—Spencer & Frank

[57] ABSTRACT

A hood cover includes a central section and two side sections. An unfolded hood is covered by the central section. The central section can be pivoted from a first covering position with the hood unfolded via an intermediate position in which the central section can be passed by the hood, into a second covering position for a stowage space which contains the hood. The two individually removable side sections are arranged symmetrically with respect to a longitudinal axis of a vehicle and cover struts of the hood when the hood is unfolded. When the hood is folded, the side sections are fitted in the stowage space beneath the central section when the central section is in the second covering position.

4 Claims, 3 Drawing Sheets

CONVERTIBLE TOP COVER

This application is a continuation of application Ser. No. 08/119,183, filed as PCT/DE92/01057, Dec. 17, 1992, now abandoned.

BACKGROUND OF THE INVENTION

1. Field of the Invention

The invention relates to a cover for the top of a convertible automobile, with the top being changeable from an open state, in which the top is accommodated in a storage compartment between the seat back and the trunk of the convertible and is covered, into a closed state in which the top is arrested at the convertible, and vice versa.

2. Description of the Related Art

Convertible tops of automobiles are to be covered when open in order to protect the covering skin, the rod assembly and the hinges of the convertible top, for producing better aerodynamics than would be provided by a non-covered top and for improving the overall aesthetic appearance of a convertible automobile. A problem is that it is not definite at the beginning of a trip whether the top will be open or closed for the entire trip. It must therefore be possible, in particular, to easily change the convertible top during the trip from the open into the closed state and to then stash the cover. A problem occurs particularly in convertibles having a relatively small storage space.

SUMMARY OF THE INVENTION

It is an object of the invention to provide a convertible top cover which meets the stated requirements. According to the invention this is accomplished by a middle portion which covers the open top and which can be pivoted from a first covering position, in which the top is open, through an intermediate position, in which the top is able to pass the middle portion, into a second covering position for the storage compartment when the top is closed. This middle portion is followed by two side portions which are arranged in mirror symmetry with respect to the longitudinal axis of the convertible and, when the top is open, cover the rod assembly of the cover. The side portions are individually removable and, when the top is closed, can be accommodated in the storage compartment of the automobile, preferably underneath the middle portion when the middle portion is in its second covering position.

The convertible top cover according to the invention is easily manipulated. It can easily be folded out of the way if the weather suddenly turns bad. Because it is composed of several parts, the cover can be stored in the convertible itself when the top is closed. Due to the fact that the middle portion covers the storage compartment in a second closing position even if the top is closed, that is, the middle portion remains in the interior of the car, no space is lost in the trunk. The side portions according to the invention can be accommodated in the storage compartment underneath the middle portion. Loudspeakers can easily be installed behind the head rests when generally it is possible only to install loudspeakers in front and in the doors of a convertible.

BRIEF DESCRIPTION OF THE DRAWINGS

Embodiments and modifications of the invention are disclosed in the dependent claims. One embodiment of the invention will now be described in greater detail and is illustrated in the drawing, in which:

DETAILED DESCRIPTION OF THE PREFERRED EMBODIMENT

Figure 1:
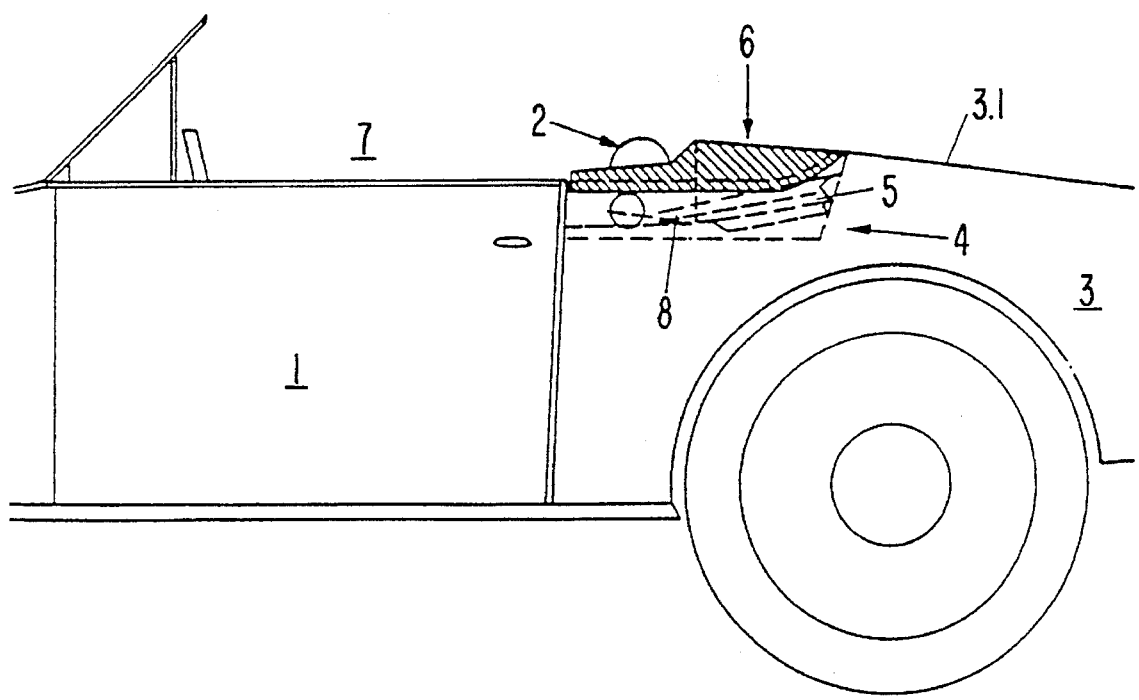
FIG. 1 is a side view of the part of the convertible automobile in which the storage compartment is disposed that accommodates the open top and is provided with a cover.
Figure 1A:
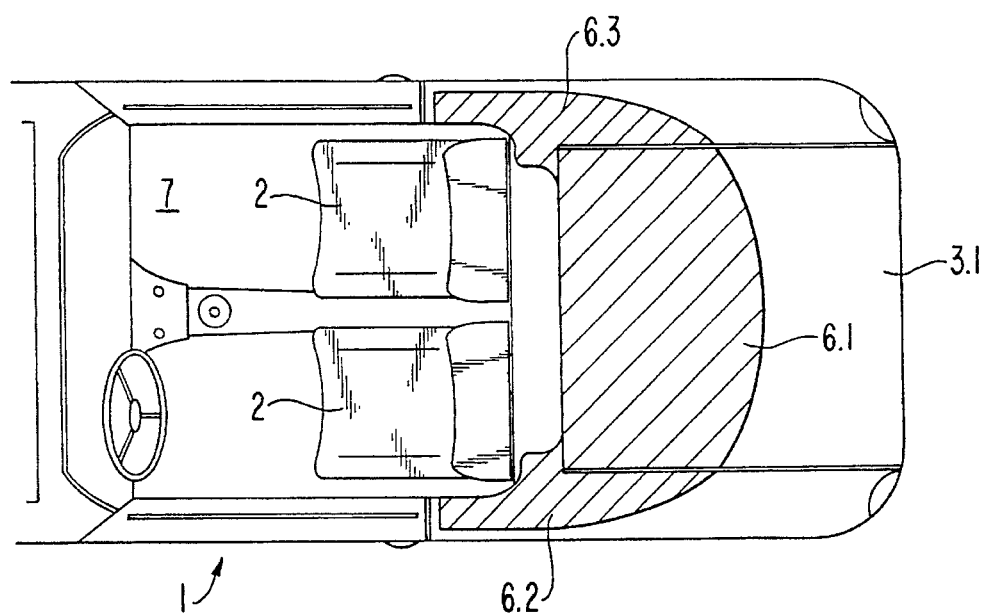
FIG. 1A is a top view of the part of the convertible automobile in which the storage compartment is disposed that accommodates the open top.
Figure 3A:
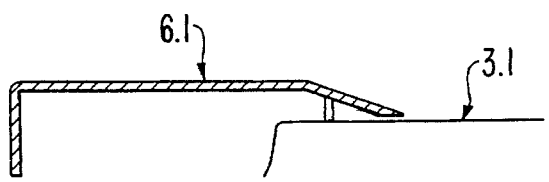
FIG. 3A shows additional detail of FIG. 3 according to the invention.
Figure 3:
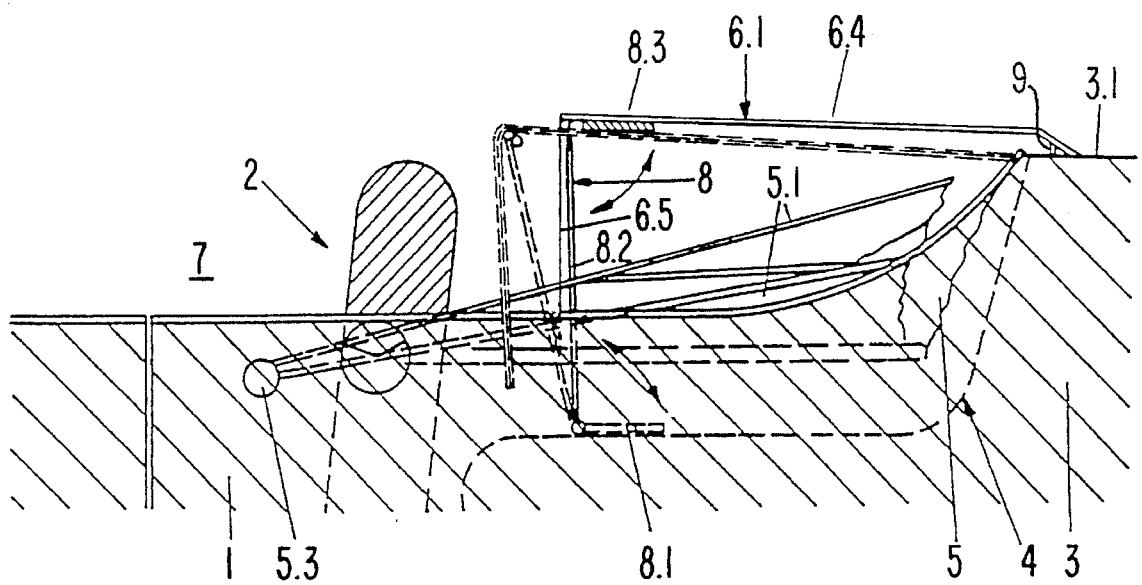
FIG. 3 shows a section of FIG. 1, to an enlarged scale, with the top open and two end positions of the cover.
Figure 4:
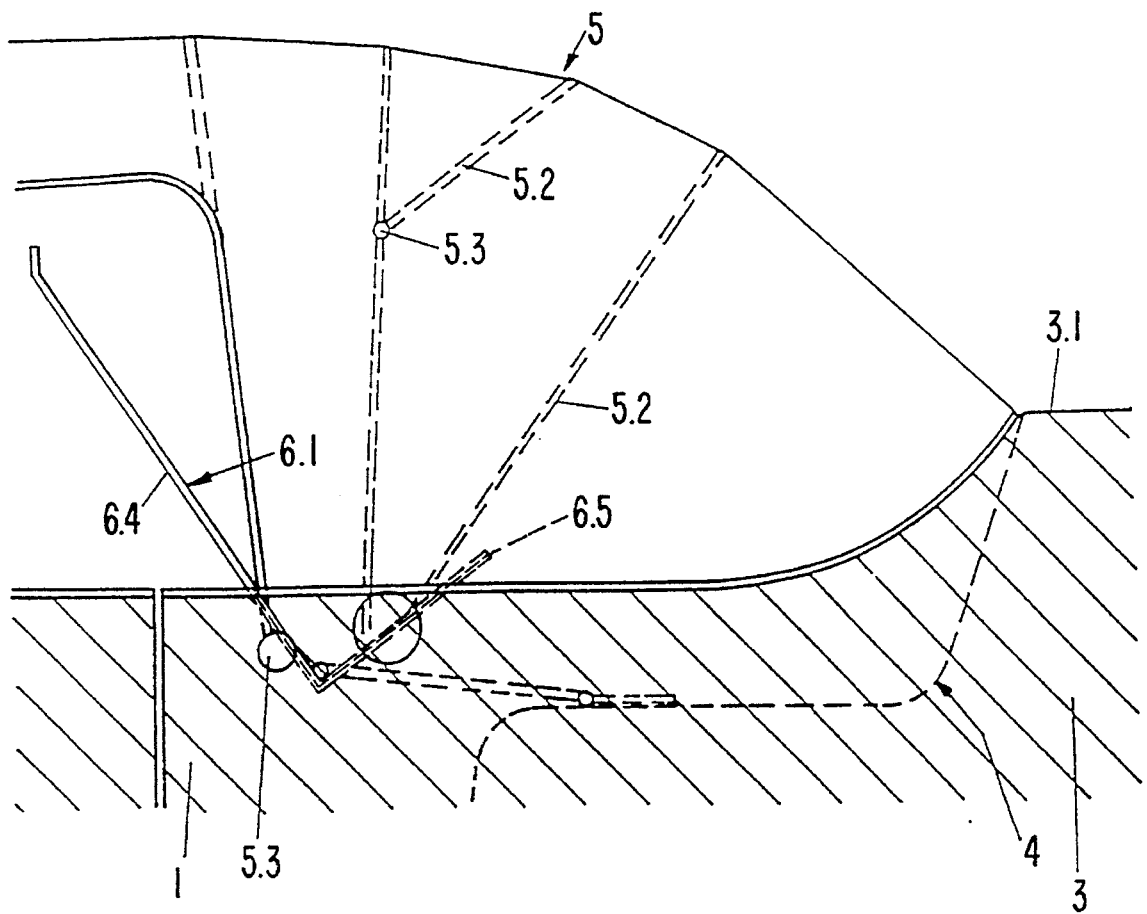
FIG. 4 is an illustration belonging to FIG. 3 showing the top closed and the cover in an intermediate position.

The convertible automobile 1 selected as the embodiment and shown in FIGS. 1 and 1A includes, between a seat back 2 and a trunk 3, a storage compartment 4 for a convertible top 5. If top 5 is accommodated in storage compartment 4, storage compartment 4 is covered by a cover 6. Top 5 can be changed from its open state shown in FIGS. 1 and 3, to a closed state which is shown in FIG. 4.

Figure 2:
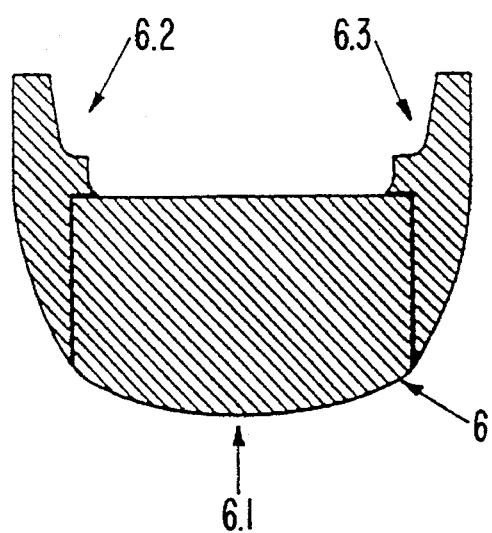
FIG. 2 is a top view of the entire cover.
Figure 5:
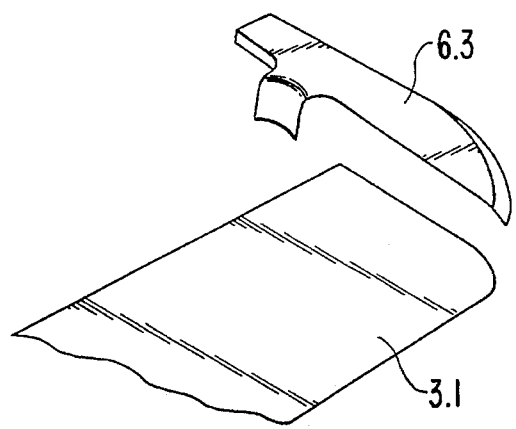
FIG. 5 is an illustration of a removable side portion according to the invention.

Cover 6 has a middle portion 6.1 (FIG. 2) which covers the open top 5. Middle portion 6.1 can be pivoted from a first covering position for the open top 5—FIG. 1 and FIG. 3 in the solidly drawn illustration—through an intermediate position—FIG. 4—in which the top 5 is able to pass it, into a second covering position—shown in FIG. 3 in a dashed illustration—for covering storage compartment 4 when top 5 is closed. Cover 6 includes two side portions 6.2 and 6.3. Side portions 6.2 and 6.3 are arranged in mirror symmetry with respect to the longitudinal axis of the convertible automobile. If top 5 is open, its rod assembly 5.1 which, in the usual manner, is composed of rods 5.2 and hinges 5.3, is covered by side portions 6.2 and 6.3. Side portions 6.2 and 6.3 can be removed individually (FIG. 5). If top 5 is closed, they can be accommodated in storage compartment 4 within the convertible automobile 1, preferably underneath middle portion 6.1 in its second covering position, shown as a illustration in FIG. 3.

To further improve the aesthetic appearance of the convertible, the connecting seams between middle portion 6.1 and the two side portions 6.2 and 6.3 are disposed in the extension of lateral grooves of a lid 3.1 for trunk 3. There, where the sides of the trunk lid are fitted into the rear fenders, the connecting seams between the portions of cover 6 are thus disposed in the extension toward seat back 2. Side portions 6.2 and 6.3 are adapted on their exterior side portions to the outline of convertible 1 in the region of the vehicle tail section, in the front inside to the outline of the cockpit 7 of convertible 1.

Middle portion 6.1 is formed by a plate 6.4 and a strip 6.5. Plate 6.4 covers storage compartment 4 toward the top. Strip 6.5 is shaped to plate 6.4 at essentially a right angle and covers storage compartment 4 toward cockpit 7.

Cover 6 is pivoted with the aid of a pivoting device 8. Pivoting device 8 includes hinges 8.1 which are fastened to the bottom of storage compartment 4. The hinges 8.1 at the bottom of storage compartment 4 are connected with a rod assembly 8.2 which at its other end is connected with further hinges 8.3. Hinges 8.3 are fastened to the middle portion 6.1 of cover 6. Advisably hinges 8.3 are fastened to middle portion 6.1 in the region of the interior angle formed between plate 6.4 and strip 6.5. Moreover, if convertible top 5 is open, the edge of middle portion 6.1 facing away from cockpit 7 is anchored with anchor 9 to convertible 1.

Let it be assumed that convertible 1 is open, that is, top 5 is accommodated in storage compartment 4 and covered by cover 6. In this position, cover 6 constitutes a unit that is integrated in the chassis of convertible 1 as shown in FIGS. 1 and 3. To close top 5, side portions 6.2 and 6.3 are removed first. Then middle portion 6.1 is pivoted about hinge 8.3, the latter together with rod assembly 8.2 is pivoted about hinge 8.1—transition from FIG. 3 to FIG. 4 -. In the pivoted-out position, rod assembly 8.2 extends essentially in the extension of the bottom of storage compartment 4; middle portion 6.1 forms an angle with rod assembly 8.2; it becomes visible in a lateral slide frame in top 5. In this position, top 5 can be closed while passing over middle portion 6.1. With top 5 closed, middle portion 6.1 is then pivoted about hinge 8.3, rod assembly 8.2 is pivoted about hinge 8.1 and takes on a position which does not differ significantly from the position in which cover 6 is anchored in convertible 1, shown in FIG. 3A -. Before this happens, side portions 6.2 and 6.3 may be placed into the storage compartment underneath middle portion 6.1.

I claim:

1. A cover for a convertible top of an automobile, comprising:

a rod assembly having first and second ends, a first hinge attached to the first end, and a second hinge attached to the second end;

a middle portion, pivotably mounted to the automobile using said rod assembly, having a plate and a strip, the strip shaped to the plate at approximately a right angle for covering a front and a top, respectively, of a storage compartment between a seat and a trunk of the automobile, the first hinge being fastened to the middle portion in a region of the right angle, and the second hinge being fastened to a bottom of the storage compartment, the convertible top being stored in the storage compartment when the convertible top is open, the middle portion having a first covering position when the convertible top is stored in the storage compartment, being pivotable through an intermediate position for allowing the convertible top to pass the middle portion when the top is being closed and being pivotable to a second covering position when the convertible top is closed, the second covering position being shifted forward relative to the first covering position; and side portions, arranged symmetrically with respect to a longitudinal axis of the automobile, for covering the storage compartment with the middle portion when the middle portion is in the first covering position, each side portion being individually removable from covering the storage compartment and are accommodated in the storage compartment when the middle portion is in the second covering position.

2. A cover according to claim 1, wherein connecting seams between the middle portion and each of the two side portions are disposed in extensions of lateral grooves in a lid of the trunk of the automobile.

3. A cover according to claim 2, wherein the side portions are shaped on their respective exterior surfaces to correspond to an outline of the automobile in a region of a tail section of the automobile and shaped on their respective interior frontal portions to correspond to the outline of a cockpit of the automobile.

4. A cover according to claim 1, wherein when the middle portion is in the first covering position, an edge of the middle portion facing away from the seat is anchored to a tail section of the automobile.

* * * * *